(12) United States Patent
Harada

(10) Patent No.: US 7,072,037 B2
(45) Date of Patent: Jul. 4, 2006

(54) DOUBLE MONOCHROMATIC SPECTROSCOPIC DEVICE

(75) Inventor: Katsumi Harada, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 0 days.

(21) Appl. No.: 10/878,754

(22) Filed: Jun. 28, 2004

(65) Prior Publication Data

US 2005/0007587 A1    Jan. 13, 2005

(30) Foreign Application Priority Data

Jul. 2, 2003    (JP)    ............................. 2003-190518

(51) Int. Cl.
*G01J 3/12* (2006.01)

(52) U.S. Cl. ..................................... 356/333

(58) Field of Classification Search ........ 356/300–328, 356/331–334; 702/104, 105, 85, 94
See application file for complete search history.

(56) References Cited

U.S. PATENT DOCUMENTS 4,971,439 A * 11/1990 Brown ....................... 356/319
6,452,674 B1   9/2002 Fujiyoshi

FOREIGN PATENT DOCUMENTS

JP    8-136344    5/1996

* cited by examiner

*Primary Examiner*—Tu T. Nguyen
(74) *Attorney, Agent, or Firm*—Rankin, Hill, Porter & Clark LLP

(57) ABSTRACT

Detected and stored are zero-order light positions which are an angular position of the pre-spectroscope and that of the main spectroscope at which a main light ray incident on the inlet slit reaches the outlet slit via the pre-spectroscope and the main spectroscope. In a state where the main spectroscope is located at its zero-order light position, the pre-spectroscope is rotated to detect the angular position of the pre-spectroscope for a predetermined wavelength. Further, in a state where the pre-spectroscope is located at its zero-order light position, the main spectroscope is rotated to detect the angular position of the main spectroscope for the predetermined wavelength.

5 Claims, 3 Drawing Sheets

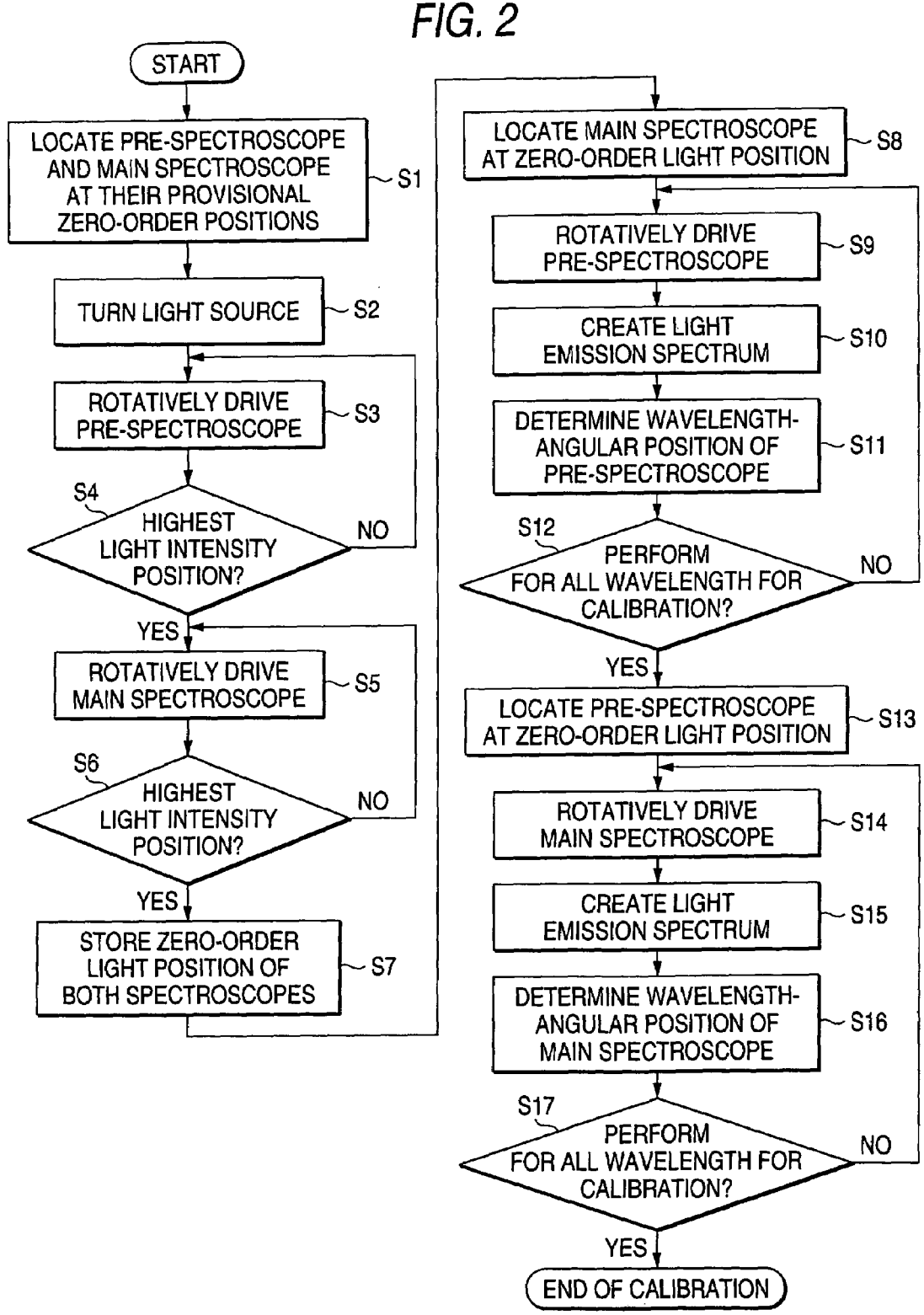

DOUBLE MONOCHROMATIC SPECTROSCOPIC DEVICE

BACKGROUND OF THE INVENTION

1. Field of the Invention

The present invention relates to a double monochromatic spectroscopic device, and more particularly to a wavelength calibrating mechanism and method of a pre-spectroscope and a main spectroscope in the double monochromatic spectroscopic device.

2. Description of the Related Art

FIG. 3 shows an exemplary wavelength scanning mechanism in a conventional double monochromatic spectroscopic device. A wavelength scanning mechanism 10 includes a pre-spectroscope 11 having a diffraction grating and a main spectroscope 12 having diffraction grating. An inlet slit 13 is arranged on the light-incident side of the diffraction grating of the pre-spectroscope 11. An intermediate slit 14 (which also serves as an inlet slit of the main spectroscope 12) is arranged on the light-outgoing side of the diffraction grating of the pre-spectroscope 11. An outlet slit 15 is arranged on the light-outgoing side of the main spectroscope 12. Light from a light source, after having passed through the inlet slit 13, is first incident on the diffraction grating of the pre-spectroscope 11. The incident light is diffracted by the diffraction grating, and only the monochromatic light at a predetermined wavelength of the diffracted light passes through the slit 14. A main mirror 16 is arranged in front of the slit 14. The monochromatic light passed through the slit 14, after reflected from the main mirror 16, is incident on the diffraction grating of the main spectroscope 12. As described later, the diffraction grating of the main spectroscope 12 is in synchronism with that of the pre-spectroscope 14. For this reason, the monochromatic light at the wavelength equal to that of the monochromatic light outgoing from the outlet slit 14 of the pre-spectroscope 11 outgoes from the diffraction grating of the main spectroscope 12 and reflects from the main mirror 16. Thereafter, the reflected monochromatic light passes through the outlet slit 15. The monochromatic light passed through the outlet slit 15 serves as output light of the wavelength scanning mechanism 10 and is projected onto a sample.

The wavelength of the output light of the wavelength scanning mechanism 10 varies in such a manner that the diffraction grating of the pre-spectroscope 11 and that of the main spectroscope 12 rotate in synchronism with each other, thereby performing wavelength scanning. The driving mechanism for this wavelength scanning includes a single feeding screw 17 and two sign bars 18, 19 as main components and is structured such that the pre-spectroscope 11 and the main spectroscope 12 are connected by a parallel link 20 (This structure is referred to as a feeding screw/sign bar system).

However, this feeding screw/sign bar system requires a large number of components. Particularly, in order to realize the parallel link 20 with high rigidity and high precision for rotating the diffraction grating of the pre-spectroscope 11 smoothly, this feeding screw/sign bar system requires a large number of components. Further, the accuracy necessary for the synchronizing operation between the pre-spectroscope 11 and the main spectroscope 12 cannot be assured by controlling a motor 21 which is a driving source. For this purpose, the two sign bars 18 and 19 must be adjusted strictly. As a result, the operation for adjustment becomes troublesome.

In order to obviate such an inconvenience, there have been proposed a spectroscopic device with a synchronizing mechanism which includes individual driving units (first driving unit and second driving unit) attached to diffraction elements of the pre-spectroscope and the main spectroscope and a control unit for operating both driving units in synchronism with each other by sophisticated control (JP-A-8-136344). This synchronizing control controls the non-linearity between the rotating angle of each of the diffraction elements of the pre-spectroscope and the main spectroscope and the wavelength of the outgoing light from each diffraction element, and also controls the reduction gear ratio of the first driving unit and that of the second driving unit.

In the spectroscopic device equipped with the synchronizing mechanism, the number of components necessary to realize the wavelength scanning mechanism is reduced as compared with the conventional feeding screw/sign bar system. For this reason, the entire device has been downsized and its reliability has been improved. In addition, since there is no mechanical link between both spectroscopes, advantages of increasing the degree of freedom of arrangement of both spectroscopes and selection of gratings and mounting manners have been obtained.

However, the spectroscopic device such a sophisticated control mechanism also requires that the wavelength of each spectroscope is calibrated after the device has been assembled or has been used for a long time. The wavelength of the light extracted by the spectroscope is determined by the arrangement of the inlet slit, outlet slit and spectroscopes (diffraction coefficients) therebetween. The assembling error occurring when these components are assembled leads to an error in the wavelength of the diffracted and extracted light. Further, the accuracy of setting the angle of the driving source for each spectroscope and the precision of the spectroscopes also affect the accuracy of the wavelength of the extracted light. In a double monochromatic spectroscopic device, changes in the wavelength of each of the pre-spectroscope and the main spectroscope greatly deteriorate the extraction efficiency of light energy. The above various errors greatly affect the performance of the spectroscopic device.

The above JP-A-8-136344 discloses the structure of the spectroscopic device, but does not teach the calibration of the wavelength.

SUMMARY OF THE INVENTION

An object of the present invention is to provide a double monochromatic spectroscopic device which can calibrate the wavelength of each of a pre-spectroscope and a main spectroscope easily and accurately.

The present invention accomplished to solve the above problem is a double monochromatic spectroscopic device with a pre-spectroscope and a main spectroscope arranged between an inlet slit and an outlet slit, characterized by comprising:

(a) a storage section for storing zero-order light positions which are an angular position of the pre-spectroscope and an angular position of the main spectroscope at which a main light ray incident on the inlet slit reaches the outlet slit via the pre-spectroscope and the main spectroscope;

(b) a main spectroscope calibrating section for rotating the main spectroscope in a state where the pre-spectroscope is located at its zero-order light position to detect an angular position of the main spectroscope for a target wavelength; and (c) a pre-spectroscope calibrating section for rotating the pre-spectroscope in a state where the main spectroscope is located at its zero-order light position to detect an angular position of the pre-spectroscope for the predetermined wavelength.

The process of calibrating the wavelength of each of the pre-spectroscope and main spectroscope in the present invention is likewise performed as follows.

(a) detecting and storing zero-order light positions which are an angular position of the pre-spectroscope and an angular position of the main spectroscope at which a main light ray incident on the inlet slit reaches the outlet slit via the pre-spectroscope and the main spectroscope;

(b) rotating the main spectroscope in a state where the pre-spectroscope is located at its zero-order light position to detect an angular position of the main spectroscope for a predetermined wavelength; and (c) rotating the pre-spectroscope in a state where the main spectroscope is located at its zero-order light position to detect an angular position of the pre-spectroscope for the predetermined wavelength.

Incidentally, the order of steps of (b) and (c) is reversible.

In carrying out the calibration according to the present invention, the light containing a known emission line as in a mercury lamp or a deuterium lamp is employed. By carrying out the above calibration using one or plural light rays (calibration light) including plural emission lines in a wavelength range for calibration, the wavelength calibration for the pre-spectroscope and main spectroscope in the wavelength range can be realized.

First, in order to define the zero-order position of each of the pre-spectroscope and the main spectroscope, a provisional zero-order light position of each of both spectroscopes is defined on the basis of the geometrical positional relationship among the inlet slit, outlet slit and each spectroscope. In this state, a calibration light ray (which may be any light ray) is introduced from the inlet slit. The pre-spectroscope and main spectroscope are rotated within a minute angular range, respectively while the intensity of the light ray outgoing from the outlet slit is being measured. The angular positions of the pre-spectroscope and main spectroscope when the intensity of the light ray outgoing from the outlet slit is the highest are the corresponding zero-order light positions.

Next, in the state where the pre-spectroscope is located at its zero-order light position, the calibration light is caused to be incident from the inlet slit. By rotating the main spectroscope while the intensity of the light outgoing from the outlet slit is being measured, the emission line spectrum of the calibration light ray is obtained. By correlating the wavelength of a known emission line in the emission line spectrum with the corresponding angular position of the main spectroscope, the angular position of the main spectroscope for a predetermined wavelength can be detected.

The wavelength calibration for the pre-spectroscope is carried out in the same manner. Specifically, in the state where the main spectroscope is located at its zero-order light position, the calibration light is caused to be incident from the inlet slit. By rotating the pre-spectroscope while the intensity of the light outgoing from the outlet slit is being measured, the emission line spectrum of the calibration light ray is obtained. By correlating the wavelength of a known emission line in the emission line spectrum with the corresponding angular position of the pre-spectroscope, the angular position of the pre-spectroscope for the predetermined wavelength can be detected.

In the double monochromatic spectroscopic device according to the present invention, as described above, the intensity of the light ray outgoing from the outlet slit may be measured while each of the spectroscopes is being rotatively driven. For this reason, automation of the wavelength calibration can be easily made using a computer. Thus, the function for carrying out such a calibration operation can be added to the double monochromatic spectroscopic device easily and at low cost. During the manufacture, the time and labor required for the calibration can be largely shortened, thereby greatly improving the productivity of the spectroscopic device.

BRIEF DESCRIPTION OF THE DRAWINGS

FIG. 2 is a flowchart showing the calibration procedure for a pre-spectroscope and a main spectroscope by a wavelength scanning mechanism in a double monochromatic spectroscopic device according to this embodiment.

DETAILED DESCRIPTION OF THE INVENTION

Figure 1A:
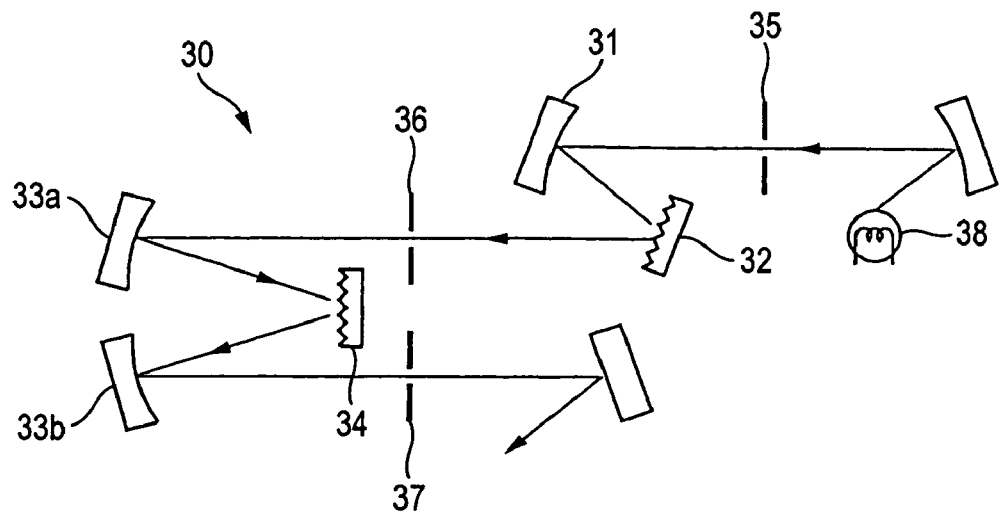
FIG. 1A is an optical system diagram of a double monochromatic spectroscopic device according to an embodiment of the present invention.
Figure 1B:
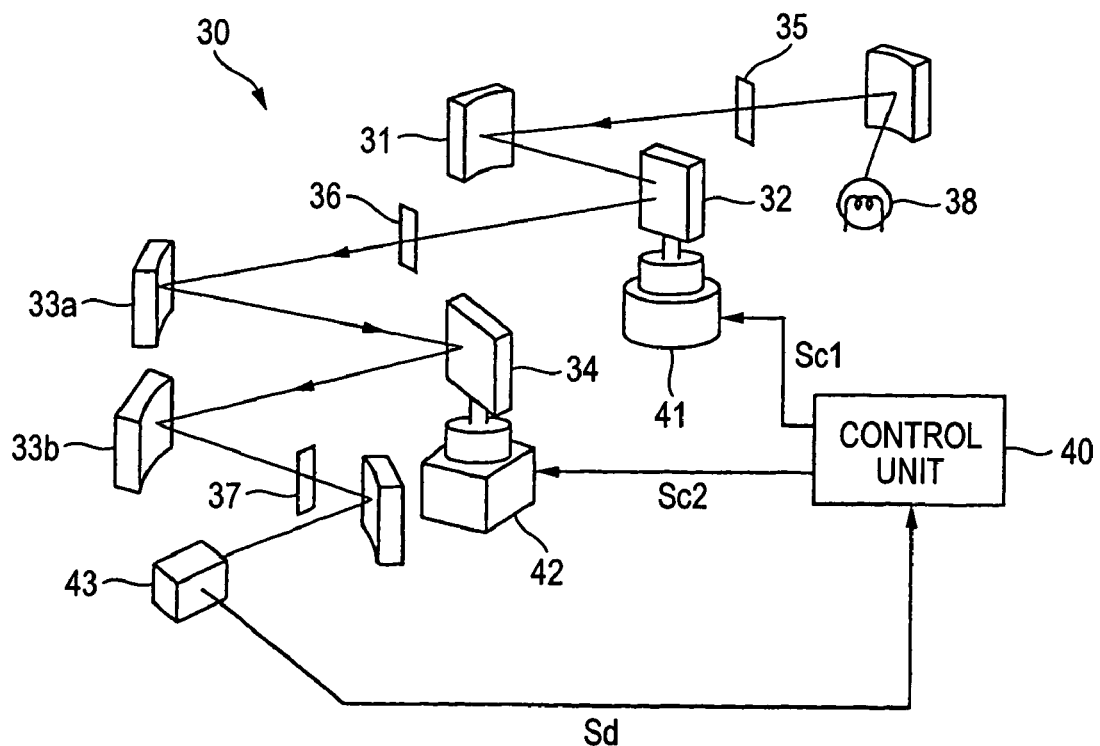
FIG. 1B is an arrangement view of optical elements in the double monochromatic spectroscopic device of FIG. 1A.
Figure 3:
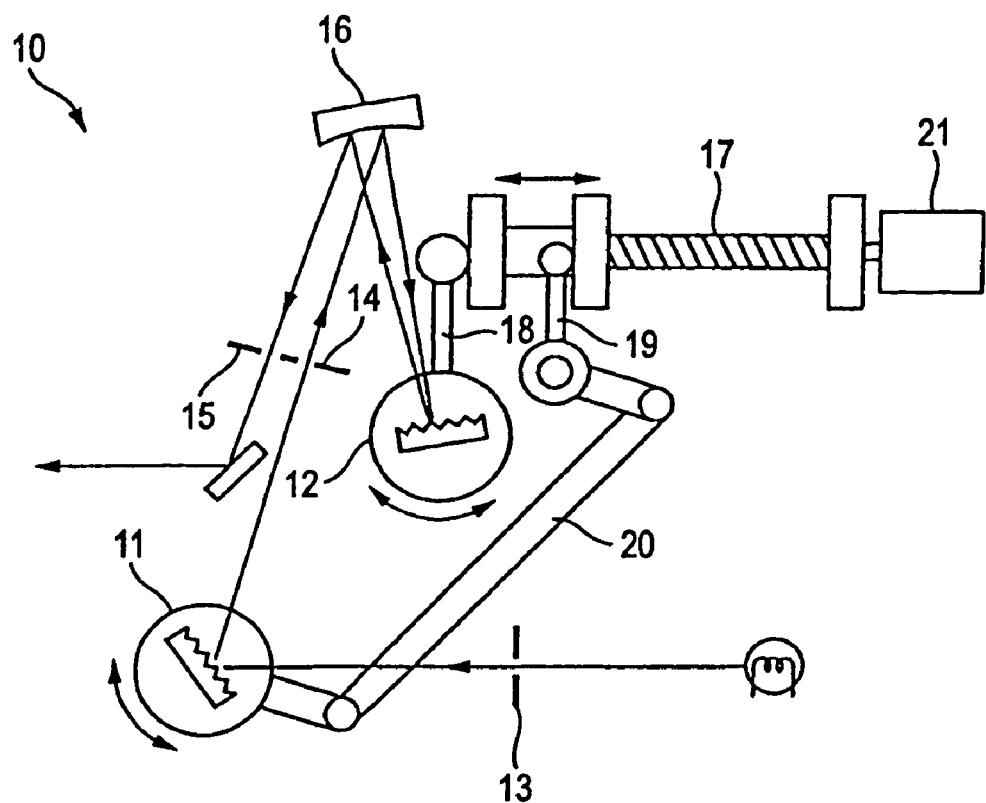
FIG. 3 is an arrangement view of optical elements in a conventional double monochromatic spectroscopic device.

FIG. 1A is an optical system diagram of a double monochromatic spectroscopic device which is an embodiment of the present invention and FIG. 1B is a perspective view of the arrangement of main components.

As seen from FIG. 1A, a spectroscopic device 30 according to this embodiment includes a pre-spectroscope and a main spectroscope. The pre-spectroscope is a Monk-Gyreeson type spectroscope composed of a concave mirror 31 and a concave diffraction grating 32. The main spectroscope is a Czerny-Turner spectroscope composed of two concave mirrors 33a, 33b and a planar diffraction grating 34. An inlet slit 35 is arranged on the light-incident side of the diffraction grating 32 of the pre-spectroscope. An intermediate slit 36 (which also serves as an inlet slit of the main spectroscope) is arranged on the light-outgoing side of the diffraction grating 32 of the pre-spectroscope. An outlet slit 15 is arranged on the light-outgoing side of the main spectroscope 12. Light from a light source 38, after a part thereof having passed through the inlet slit 13 and reflected from the concave mirror 31, is incident on the diffraction grating 32 of the pre-spectroscope. The incident light is diffracted by the diffraction grating 32. The monochromatic light at a predetermined wavelength of the diffracted light passes through the slit 36. The monochromatic light passed through the slit 36, after reflected from the concave mirror 33a, is incident on the diffraction grating 34 of the main spectroscope. As described later, the diffraction grating 34 of the main spectroscope is in synchronism with the diffraction grating 32 of the pre-spectroscope. For this reason, the monochromatic light at the wavelength equal to that of the monochromatic light outgoing from the outlet slit 36 of the pre-spectroscope outgoes from the diffraction grating 34 of the main spectroscope and passes through the outlet slit 37. The light (monochromatic light) passed through the outlet slit 37 serves as output light (hereinafter referred to as a bundle of an outgoing light ray) from the wavelength scanning mechanism 30.

As seen from FIG. 1B, the wavelength scanning mechanism according to this embodiment has driving units for rotating the diffraction gratings including a first driving unit 41 which serves to rotate the diffraction grating 32 of the pre-spectroscope and a second driving unit 42 which serves to rotate the diffraction grating 34 of the main spectroscope. These two driving units 41 and 42 are mechanically independent of each other. Each driving unit has a configuration in which a decelerator and a stepping motor are combined with each other. Further, the wavelength scanning mechanism according to this embodiment includes a control unit 40 which is constructed using a microcomputer. The control unit 40 supplies a first control signal Sc1 and a second control signal Sc2 to the first driving unit 41 and the second driving unit 42, respectively. The first driving unit 41 and the second driving unit 42 operate on the basis of the first control signal Sc1 and the second control signal Sc2, respectively so that the diffraction gratings 32 and 34 operate in synchronism with each other. This synchronizing operation gradually changes the wavelength of the bundle of an outgoing light ray, thereby realizing the wavelength scanning.

The operation of the wavelength scanning in the wavelength scanning mechanism 30 having such a mechanism is described in detail in the above JP-A-8-136344. Now, an explanation will be given of the automatic calibrating operation of the pre-spectroscope and main spectroscope according to the present invention. In order to implement such an automatic calibrating operation, the wavelength scanning mechanism 30 according to this embodiment is provided with a photometer 43 behind the outlet slit 37. A light intensity signal Sd from the photometer 43 is supplied to the control unit 40. In the following procedure as shown in FIG. 2, the control unit 40 carries out the calibration for each spectroscope on the basis of the light intensity signal Sd received from the photometer 43 and the output signals Sc1 and Sc2 supplied to the respective driving units 41 and 42 of the pre-spectroscope and the main spectroscope.

First, the diffraction grating 32 of the pre-spectroscope and the diffraction grating 34 of the main spectroscope are located at their angular positions (provisional zero-order light positions) at which a zero-order light ray is incident from the inlet slit 35 and outgoes from the outlet slit 37, these angular positions being determined on the basis of the geometrical arrangement of the optical system (FIG. 1A) (step S1). The light source 38 is turned on (step S2). While referring to the output signal Sd from the photometer 43, the first control signal Sc1 is supplied to the first driving unit 41 to rotate the diffraction grating 32 of the pre-spectroscope gradually (step S3). By rotating the diffraction grating 32 of the pre-spectroscope within a suitable range before and behind the provisional zero-order light position, the angular position of the diffraction grating 32 of the pre-spectroscope at which the output signal Sd from the photometer 43 is the highest is detected. This angular position is determined as a zero-order light position of the pre-spectroscope (step S4). By carrying out the same operation for the diffraction grating 34 of the main spectroscope, a zero-order light position of the main spectroscope is determined (steps S5 and S6). The respective zero-order light positions of the diffraction gratings 32 and 34 of both spectroscopes are stored in the storage portion provided within the control unit 40 (step S7).

Next, the diffraction grating 34 of the main spectroscope is located at its zero-order light position (step S8). In this state, the control unit 40, while receiving the intensity signal Sd from the photometer 43, rotatively drives the diffraction grating 32 of the pre-spectroscope within a predetermined range (step S9). Thus, the emission line spectrum of the light source 38 within a predetermined wavelength range is created (step S10). By using the light ray including the emission line having a known wavelength as the light source 38, the relationship between the angular position of the diffraction grating 32 of the pre-spectroscope (strictly speaking, the control signal Sc1 supplied from the control unit 40 to the first driving unit 41) and the wavelength is calibrated (step S11). It is determined whether or not such calibration of the wavelength has been performed for all the wavelengths for calibration (step S12). If not, the calibration process is returned to step S9 so that the relationship between the angular position of the diffraction grating 32 and the wavelength is likewise calibrated for the wavelength for calibration. When the calibration has been completed for all the wavelengths for calibration, the wavelength calibration for the pre-spectroscope is ended (step S12 to step S13).

The wavelength for calibration may be known emission line wavelengths of the light source 38 such as a mercury lamp or a deuterium lamp. In the case of the deuterium lamp, the emission line wavelengths of e.g. 486.0 nm, 656.1 nm, etc. can be adopted. In the case of the mercury lamp, the emission line wavelengths of e.g. 194.1 nm, 253.7 nm, 296.7 nm, 365.0 nm, 404.7 nm, 435.8 nm, 507.4 nm (secondary light of 253.7 nm), 546.1 nm, 579.0 nm, 761.0 nm (tertiary light of 253.65 nm), 809.4 nm (secondary light of 404.7 nm), etc.

The same calibration is performed for the main spectroscope. Specifically, the diffraction grating 32 of the pre-spectroscope is located at its zero-order light position (step S13). In this state, the control unit 40, while receiving the intensity signal Sd from the photometer 43, rotatively drives the diffraction grating 34 of the main spectroscope within a predetermined range (step S14). Thus, the emission line spectrum of the light source 38 is created (step S15). The relationship between the angular position of the diffraction grating 34 of the main spectroscope (strictly speaking, the control signal Sc2 supplied from the control unit 40 to the second driving unit 42) and the wavelength is calibrated (step S16). When the calibration has been completed for all the wavelengths for calibration (step S17), the calibrating operation is ended.

What is claimed is:

1. A double monochromatic spectroscopic device with a pre-spectroscope and a main spectroscope arranged between an inlet slit and an outlet slit, comprising:

a light source for projecting a calibration light to the inlet slit;

a light intensity measuring section for measuring a light intensity of the calibration light outgoing from the outlet slit, a control unit including a storage section for storing zero-order light positions, which are an angular position of a diffraction grating of the pre-spectroscope and an angular position of a diffraction grating of the main spectroscope at which a main light ray incident on the inlet slit reaches the outlet slit via the pre-spectroscope and the main spectroscope, said control unit being operable, in response to signals from said light intensity measuring section, to selectively actuate and monitor a main spectroscope diffraction grating drive unit and a pre-spectroscope diffracting grating drive unit so as to independently control the angular position of the main spectroscope diffraction grating and the anaular position of the pre-spectroscope diffraction grating;

a main spectroscope calibrating section including said main spectroscope diffraction grating drive unit and operable in response to control signals from said control unit, for rotating the main spectroscope diffraction grating while said pre-spectroscope diffraction grating drive unit is positioned in a state corresponding to the zero-order light position of the pre-spectroscope diffraction grating so as to detect an angular position of the main spectroscope for a predetermined wavelength with the light intensity measuring section; and a pre-spectroscope calibrating section including said pre-spectroscope diffraction grating drive unit and operable in response to control signals from said control unit, for rotating the pre-spectroscope diffraction grating while said main spectroscope diffraction grating is positioned in a state corresponding to zero-order light position of the main spectroscope diffraction grating so as to detect an angular position of the pre-spectroscope for the predetermined wavelength with the light intensity measuring section.

2. The double monochromatic spectroscopic device according to claim 1, wherein said predetermined wavelength is an emission line wavelength of the light source.

3. A method for calibrating a double monochromatic spectroscopic device with a pre-spectroscope and a main spectroscope arranged between an inlet slit and an outlet slit, comprising:

(a) detecting and storing zero-order light positions for the pre-spectroscope and for the main spectroscope, said zero-order light positions being angular positions of the pre-spectroscope and an the main spectroscope, respectively, at which a main light ray incident on the inlet slit reaches the outlet slit via the pre-spectroscope and the main spectroscope;

(b) rotating the main spectroscope while said pre-spectroscope is located at the pre-spectroscope zero-order light position to detect an angular position of the main spectroscope for a predetermined wavelength; and (c) rotating the pre-spectroscope while said main spectroscope is located at the main spectroscope zero-order light position to detect an angular position of the pre-spectroscope for the predetermined wavelength.

4. A method for calibrating a double monochromatic spectroscopic device according to claim 3, further comprising:

(d) projecting a calibration light to the inlet slit; and (e) measuring a light intensity of the calibration light outgoing from the outlet slit, wherein the steps (b) and (c) rotate the main spectroscope and the pre-spectroscope, respectively, based on the light intensity measured in step (e).

5. The method for calibrating a double monochromatic spectroscope device according to claim 3, wherein said the predetermined wavelength is an emission line wavelength of the light source.

* * * * *